(12) United States Patent
Qing et al.

(10) Patent No.: US 7,751,349 B2
(45) Date of Patent: Jul. 6, 2010

(54) SIGNALLING EXCHANGE METHOD FOR GUARANTEEING INTERNET PROTOCOL QUALITY OF SERVICE

(75) Inventors: Wu Qing, Guangdong (CN); Ting Zou, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 467 days.

(21) Appl. No.: 11/652,101

(22) Filed: Jan. 11, 2007

(65) Prior Publication Data

US 2007/0147389 A1 Jun. 28, 2007

Related U.S. Application Data

(63) Continuation of application No. PCT/CN2005/001177, filed on Aug. 2, 2005.

(30) Foreign Application Priority Data

Aug. 2, 2004 (CN) .................... 2004 1 0070400

(51) Int. Cl.
*H04L 12/16* (2006.01)
(52) U.S. Cl. ...................... 370/270; 370/352
(58) Field of Classification Search ............ 370/352, 370/110, 331; 709/226, 219; 710/305
See application file for complete search history.

(56) References Cited

U.S. PATENT DOCUMENTS 5,440,563 A * 8/1995 Isidoro et al. ............... 370/270
6,901,474 B2 * 5/2005 Lym et al. .................. 710/305
7,068,624 B1 * 6/2006 Dantu et al. ................ 370/331
7,180,889 B1 * 2/2007 Kung et al. ................. 370/352
7,376,710 B1 * 5/2008 Cromwell et al. ........... 709/219
2002/0062376 A1 * 5/2002 Isoyama ..................... 709/226
2003/0203736 A1 10/2003 Chi et al.

FOREIGN PATENT DOCUMENTS

| EP | 1 119 120 A2 | 7/2001 |
| EP | 1 206 067 A1 | 5/2002 |
| EP | 1365545 | 11/2003 |
| GB | 2 386 282 A | 9/2003 |
| WO | WO 03043266 | 5/2003 |
| WO | WO 03094404 | 11/2003 |

OTHER PUBLICATIONS

Extended European search report, Application No./Patent No. 05771384.-2416/ 1760935, date Apr. 9, 2010, 4 pages.

* cited by examiner

*Primary Examiner*—Kwang B Yao
*Assistant Examiner*—Syed Bokhari
(74) *Attorney, Agent, or Firm*—Slater & Matsil, L.L.P.

(57) ABSTRACT

A signalling exchange method for guaranteeing Internet Protocol (IP) Quality of Service (QoS), including: after a Call Agent (CA) receives a request from a source User Agent (UA) for transferring a user service stream, sending a QoS resource request from the CA to the bearer control layer; allocating resources for the user service stream on the bearer control layer, and carrying out flow mapping for an Edge Router (ER) according to the resource allocation result; after receiving a flow mapping command, the ER allocating a bearer path for the user service stream based on the allocated resources, and transferring an execution result to the CA via the bearer control layer.

17 Claims, 7 Drawing Sheets

SIGNALLING EXCHANGE METHOD FOR GUARANTEEING INTERNET PROTOCOL QUALITY OF SERVICE

CROSS-REFERENCE TO RELATED APPLICATIONS

This is a continuation of International Application No. PCT/CN2005/001177, filed on Aug. 2, 2005, now published as WO 2006/012794, published date Feb. 9, 2006, which designated the United States; which claims priority of Chinese Patent Application No. 200410070400.6, filed Aug. 2, 2004, the disclosure of each application is hereby incorporated by reference in their entirety.

FIELD OF THE INVENTION

The present invention relates to signalling exchange techniques, and more particularly, to a signalling exchange method for guaranteeing Internet Protocol (IP) Quality of Service (QoS).

BACKGROUND OF THE INVENTION

With the scale-up of Internet, network services arise one after another, and advanced multimedia systems emerge in endlessly. Thus, the Internet needs to transfer multimedia services, such as services complying with File Transfer Protocol (FTP) which are of high burstiness, or services complying with Hypertext Transfer Protocol (HTTP) which contain image files. As to real time services in the network, which are relatively sensitive to network characteristics such as latency and jitter, transmission of FTP and HTTP services may have a great influence on them. Moreover, those multimedia services may occupy a great deal of bandwidth, which makes it difficult in the conventional network to reliably transfer some key services in need of guaranteed bandwidth.

In view of the above, diversified QoS techniques are proposed, e.g., many service models and mechanisms have been set up by IETF. Among these QoS techniques, the most approbatory one by those skilled in the art is a scheme put forward by IETF, where an Int-Serv model is applied during the access to and/or at the edge of the network, and a Diff-Serv model is applied in the core area of the network. However, the Diff-Serv model of the scheme provides priority levels to guarantee QoS, so it is difficult to guarantee transmission reliability and effect of the whole network, although the scheme is of high channel availability in the network.

In the process of allocating paths for user service streams, signal exchange of IP QoS is needed between a service control layer and a Call Manager (CM), as well as among CMs, so as to satisfy the conversation resource demand in each management domain, as well as determine the resource reservation mode according to requirements of operators. It can be seen that an IP QoS signaling process is important for guaranteeing QoS of the bearer network. However, there isn't any uniform IP QoS signalling process at present.

SUMMARY

Some embodiments of the present invention is to provide a signalling exchange method for guaranteeing IP QoS, so that the network based on the Diff-Serv model with an independent bearer control layer can determine a bearer path for a user service stream according to the signalling exchange scheme.

A signalling exchange method for guaranteeing Internet Protocol (IP) Quality of Service (QoS), which is applicable for a network with an independent bearer control layer, including:

after a Call Agent (CA) receiving a request from a source User Agent (UA) for transferring a user service stream, sending a QoS resource request from the CA to the bearer control layer;

allocating resources for the user service stream on the bearer control layer, and carrying out flow mapping for an Edge Router (ER) according to the resource allocation result;

after receiving a flow mapping command, the ER allocating a bearer path for the user service stream based on the allocated resources, and transferring an execution result to the CA via the bearer control layer.

According to some embodiments of the present invention, after receiving a request for transferring a user service stream, the Call Agent (CA) asks the bearer control layer to allocate resources. Then, flow mapping for an Edge Router (ER) is carried out according to the resource allocation result, and afterwards, the ER will allocate a bearer path for the user service stream. Thereby, an IP QoS signalling process for the user service stream is formed, which provides a convenience to allocate bearer paths for the network with an independent bearer control layer.

Further, the embodiments of the present invention provide a single-phase and a two-phase IP QoS signalling process. In the single-phase processing, a flow mapping command will be sent to an ER without receiving an indication from the CA, and gating will be opened afterwards, whereas in the two-phase processing, after finishing resource allocation, the bearer control layer would not send a gating indication to an ER, unless an indication from the CA is received. Consequently, if other information exchanges are needed, or charging points are not strictly desired by operators, the single-phase IP QoS signalling process could be adopted before transferring user service streams; and if charging should be strictly distinguished within an operator or among operators, or if operators have some special demands, the two-phase IP QoS signalling process provided in some embodiments of the present invention could be employed. In other words, the embodiments of the present invention allow the network to select a proper scheme according to different requirements, and thus it has higher adaptability.

Additionally, in the signalling process according to some embodiments of the present invention, service streams are transferred via the bearer network, while information streams are transferred through the bearer control layer, ensuring the security and reliability of signalling transmission.

EMBODIMENTS OF THE INVENTION

The procedure of an embodiment of the invention includes: after receiving a request for transferring a user service stream, an SeCFE/SvCFE sends a QoS resource request to the bearer control layer; the bearer control layer allocates resources for the user service stream based on the received QoS resource request; a Switch Function Entity (SFE) carries out flow mapping based on the resources allocated by the bearer control layer, allocates a bearer path for the user service stream, and sends an execution result to the CA. Here, the SeCFE/SvCFE may be a CA, and the SFE may be an ER.

In the process of allocating resources for user service streams, the bearer control layer may allocate resources for a unidirectional stream, or allocate resources for a bidirectional stream. Here, the unidirectional stream is used for transferring a service stream sent from a source user, and the bidirectional stream is used for transferring a service stream from a source user and a service stream from a destination user. Therefore, some embodiments provide corresponding procedures for the above-mentioned two conditions, which are hereinafter described in detail with reference to the attached drawings and embodiments.

Firstly, the case of unidirectional stream is described.

In the IP QoS signalling process with unidirectional streams, either single-phase or two-phase processing is available. That is, in the single-phase processing, after resource allocation is finished, the bearer control layer directly sends a flow mapping command to the ER, and opens the gating without an indication from the CA; while in the two-phase processing, after finishing the resource allocation, the bearer control layer will not send a gating indication to the ER, unless an indication from the CA is received.

Figure 1:
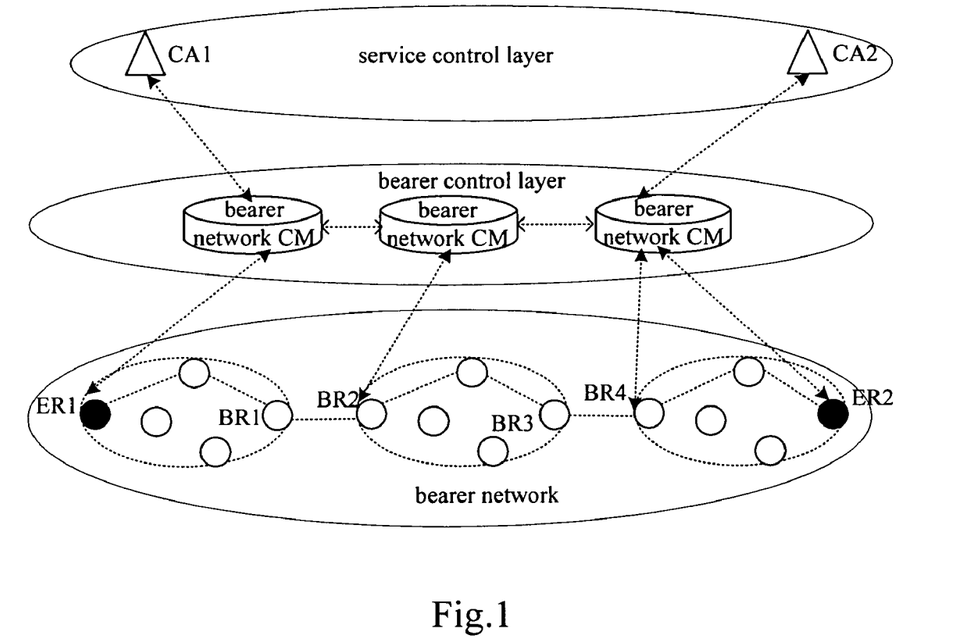
FIG. 1 is a schematic diagram illustrating the Diff-Serv model with an independent bearer control layer in prior art.
Figure 2:
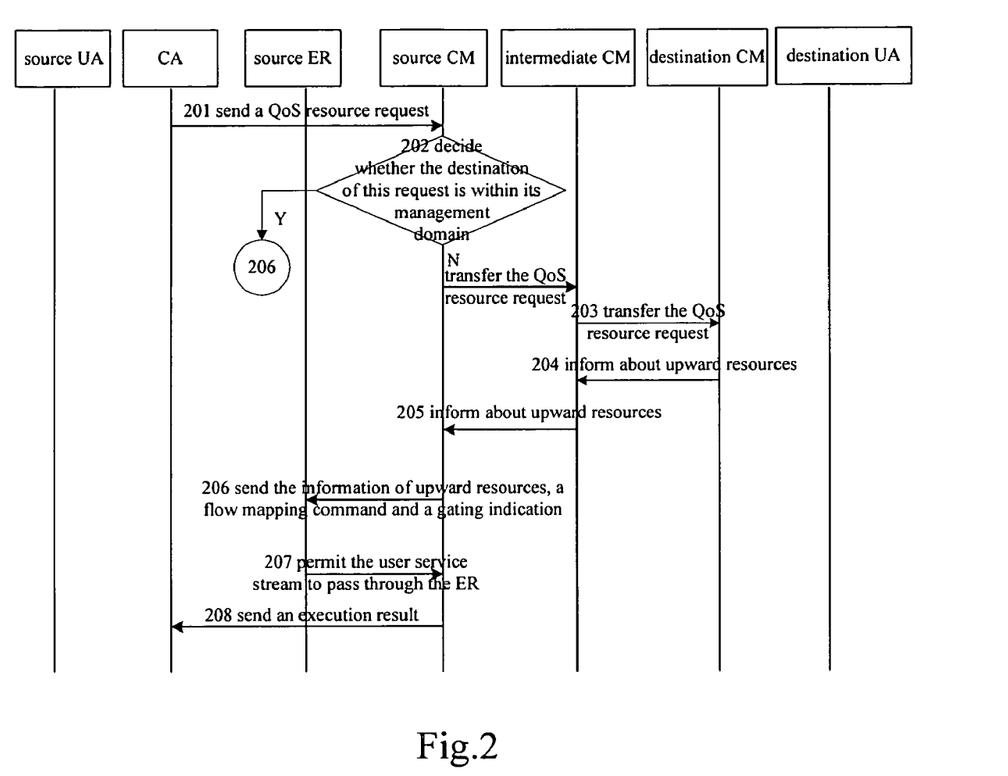
FIG. 2 is a flowchart of the single-phase IP QoS signalling process with unidirectional streams in an embodiment of the invention.

With reference to the flowchart shown in FIG. 2, the single-phase IP QoS signalling process with unidirectional streams is described in detail, which includes:

Step 201: After a CA receives a request from a source User Agent (UA) for transferring a user service stream, the CA transfers a QoS resource request to a source CM, the QoS resource request containing stream QoS parameters and information of a destination UA.

Step 202: After receiving the QoS resource request from the CA, the source CM determines whether the destination UA of the QoS resource request is within the management domain to which the source CM belongs; if not within the management domain, allocate upward resources of the management domain to which the source CM belongs to the user service stream, and transfer the QoS resource request to an intermediate CM, i.e., an intermediate BCFE; otherwise, allocate upward resources within the management domain to which the source CM belongs for the user service stream, and then forward to Step 206.

Step 203: Upon receiving the QoS resource request, the intermediate CM allocates upward resources within the management domain to which the intermediate CM belongs for the user service stream, and then transmits the QoS resource request to the destination CM, i.e., the destination BCFE.

Step 204: After receiving the QoS resource request, the destination CM allocates upward resources within the management domain to which the destination CM belongs for the user service stream, and then returns the upward resources to the intermediate CM.

Step 205: The intermediate CM combines the upward resources sent from the destination CM and the upward resources allocated by itself, and sends a combined upward resources to the source CM. Here, combining the resources means overlaying different segments to form a path.

Step 206: The source CM combines the upward resources sent from the intermediate CM and the upward resources allocated by itself, sends a combined upward resources to the source ER, i.e., the source SFE, and sends a flow mapping command and a gating indication to the source ER.

Step 207: The source ER allocates a bearer path for the user service stream based on the flow mapping command and the information of upward resources sent from the source CM, allows the user service stream to pass through itself based on the gating indication from the source CM, and notifies an execution result to the source CM.

Step 208: After receiving the execution result from the source ER, the source CM sends an execution result to the CA.

If the source CM confirms, according to the execution result from the source ER, that the bearer path has been allocated successfully, the execution result from the source CM will include information of success; otherwise, if the source CM confirms that the allocation of the bearer path fails according to the execution result from the source ER, information of failure will be carried in the execution result from the source CM.

The aforesaid is the procedure of single-phase IP QoS signalling process with unidirectional streams, and the two-phase IP QoS signalling process with unidirectional streams will be described hereinafter.

Figure 3:
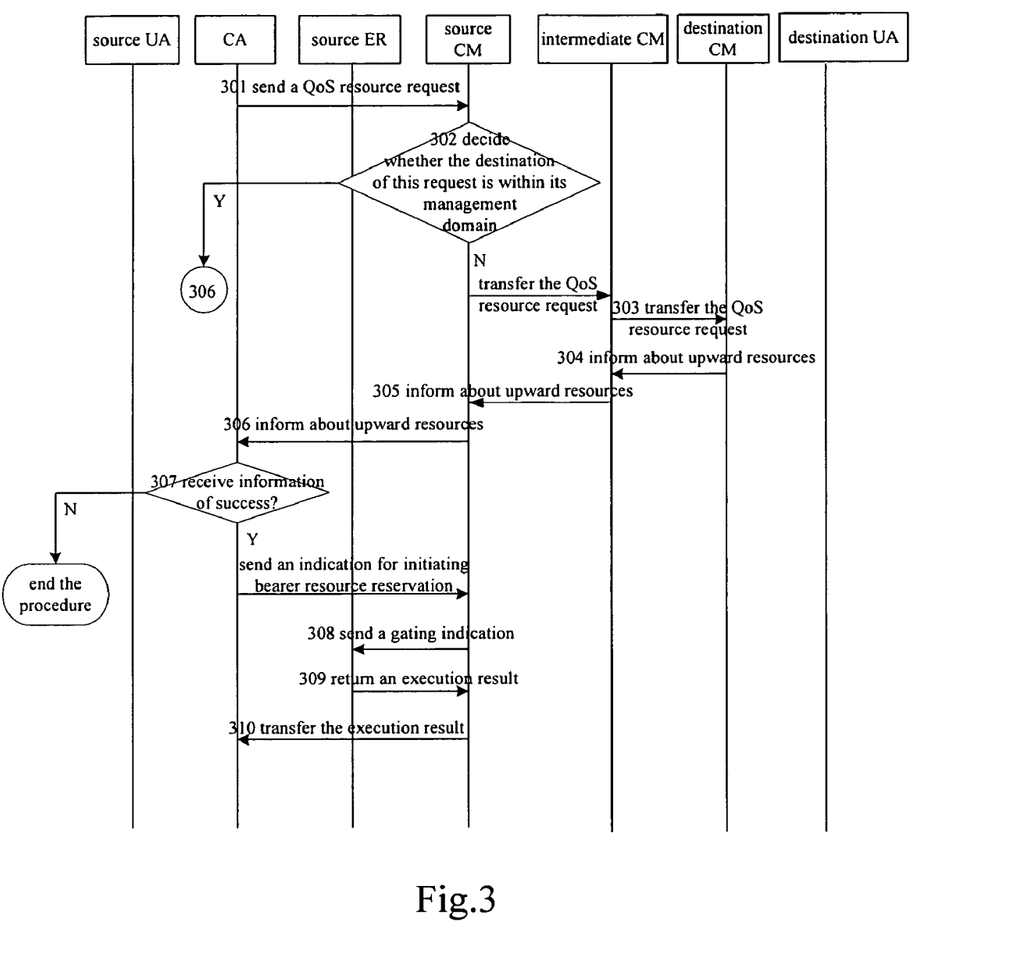
FIG. 3 is a flowchart of the two-phase IP QoS signalling process with unidirectional streams when resources are kept on a CM in an embodiment of the invention.

In the two-phase processing, before a gating indication is transferred to the source ER, information of the allocated resources could be kept either on the source CM, or on the source ER. Hereinafter, with reference to FIG. 3, the procedure of keeping resources on the CM in the two-phase IP QoS signalling process is firstly described, where the implementation process includes:

Step 301: Upon receiving a request from a source UA for transferring a user service stream, a CA sends a QoS resource request to a source CM, the QoS resource request containing stream QoS parameters, a gating indication and information of a destination UA.

Step 302: Upon receiving the QoS resource request from the CA, the source CM determines whether the destination UA of the QoS resource request is within the management domain to which the source CM belongs; if not within the management domain, allocate upward resources of the source CM's domain for the user service stream, and transmit the QoS resource request to an intermediate CM; otherwise, allocate upward resources of the source CM's domain for the user service stream, and then forward to Step 306.

Step 303: Upon receiving the QoS resource request, the intermediate CM allocates upward resources of its domain for the user service stream, and then transmits the QoS resource request to a destination CM.

Step 304: Upon receiving the QoS resource request, the destination CM allocates upward resources of its domain for the user service stream, and informs the upward resources of the destination CM's domain to the intermediate CM.

Step 305: The intermediate CM combines the upward resources sent from the destination CM and the upward resources allocated by the intermediate CM itself, and returns a combined upward resources to the source CM.

Step 306: The source CM combines the upward resources sent from the intermediate CM and the upward resources allocated by itself, and returns a resource allocation result to the CA.

The resource allocation result may contain either information of success or failure.

Step 307: If the received resource allocation result contains information of success, the CA sends an indication to the source CM for initiating bearer resource reservation. If the result contains information of failure, end the procedure.

Step 308: The source CM performs flow mapping for the source ER based on the indication and the information of upward resources received in Step 306, and sends a gating indication to the source ER.

Step 309: The source ER performs flow mapping according to the gating indication sent from the source CM, allocates a bearer path for the user service stream, and allows the user service stream to pass through itself according to the gating indication, then returns an execution result to the source CM.

Step 310: After the source CM receives the execution result from the source ER, the source CM transfers the execution result to the CA.

Figure 4:
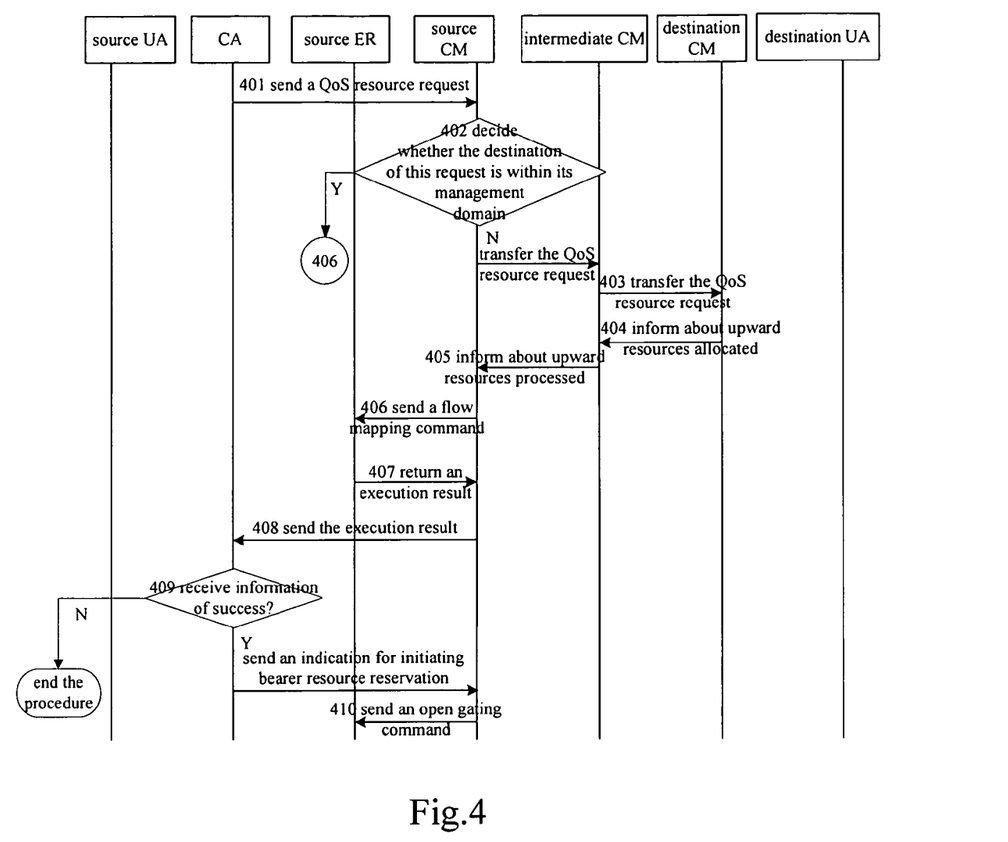
FIG. 4 is a flowchart of the two-phase IP QoS signalling process with unidirectional streams when resources are kept on an ER in an embodiment of the invention.

Comparing the aforesaid processing with the single-phase processing shown in FIG. 4, the former has one more process of returning the information of upward resource allocation result from the source CM to the CA after finishing resource allocation. However, if the resource allocation fails, it is not necessary for the CA to carry out subsequent processes. Only when the resource allocation succeeds would the CA send an indication of initiating bearer resource reservation to the source CM. Since the CA can decide whether to allow user service streams to pass through the ER according to demand, the charging point can be controlled accurately, and the bearer and control operations can be synchronized.

Referring to FIG. 4, as to the two-phase IP QoS signalling process with unidirectional streams, where resources are kept on an ER, the accompanying steps may be implemented.

Step 401: After receiving a request for transferring a user service stream from a source UA, a CA sends a QoS resource request containing stream QoS parameters, a gating indication and information of a destination UA to a source CM.

Step 402: After the source CM receives the QoS resource request from the CA, the source CM determines whether the destination UA of the QoS resource request is within its management domain; if not, allocate upward resources of its domain for the user service stream, and transmit the QoS resource request to an intermediate CM; otherwise, allocate upward resources of its domain for the user service stream, and then go to Step 406.

Step 403: After receiving the QoS resource request, the intermediate CM allocates upward resources of its domain for the user service stream, and then transmits the QoS resource request to the destination CM.

Step 404: After receiving the QoS resource request, the destination CM allocates upward resources of its domain for the user service stream, and returns the allocated upward resources to the intermediate CM.

Step 405: The intermediate CM combines the upward resources sent from the destination CM and the upward resources allocated by itself, and returns a combined upward resources to the source CM.

Step 406: The source CM combines the upward resources sent from the intermediate CM and the upward resources allocated by itself, sends a combined upward resources to the source ER, and then transfers a flow mapping command to the source ER.

Step 407: The source ER performs flow mapping according to the flow mapping command from the source CM, allocates a bearer path for the user service stream based on the upward resources sent from the source CM, and then returns an execution result to the source CM.

Step 408: After the source CM receives the execution result from the source ER, the source CM sends the execution result to the CA.

Step 409: If the execution result from the source CM contains information of success, the CA sends an indication of initiating service stream activation to the source CM for initiating service stream activation. If the result contains information of failure, end the procedure.

Step 410: After the source CM receives the indication of initiating service stream activation, the source CM sends an open gating command to the source ER, so that user service streams could be allowed to pass through the source ER.

The above are scenarios about allocating resources for unidirectional streams. In scenarios of allocating resources for bidirectional streams, a bidirectional stream can be separated into two unidirectional streams, i.e., an upward unidirectional stream and a downward unidirectional stream, with reference to operators' demand or according to other conditions. That is, resources of the two directions of bidirectional stream can be allocated respectively. For each unidirectional stream, the aforesaid processing for a unidirectional stream can be adopted. The resource allocation for an upward unidirectional stream is initiated by the source CM, while the resource allocation for a downward unidirectional stream is initiated by the destination CM. In other words, the destination CM initiates resource allocation after receiving a QoS resource request from the source CM, and then returns the resource allocation result to the source CM. When the source CM confirms that both the upward resources and downward resources are successfully allocated, it returns information of success to the CA.

Alternatively, in the allocation of bidirectional stream, upward and downward resources could be allocated uniformly, i.e., each CM may allocate the upward resources and downward resources at the same time. The situation that upward and downward resources are allocated together includes a single-phase processing and a two-phase processing, and the two-phase processing includes two cases of keeping resources on a CM or on an ER. Therefore, the procedures of these two cases are hereinafter described respectively.

Figure 5:
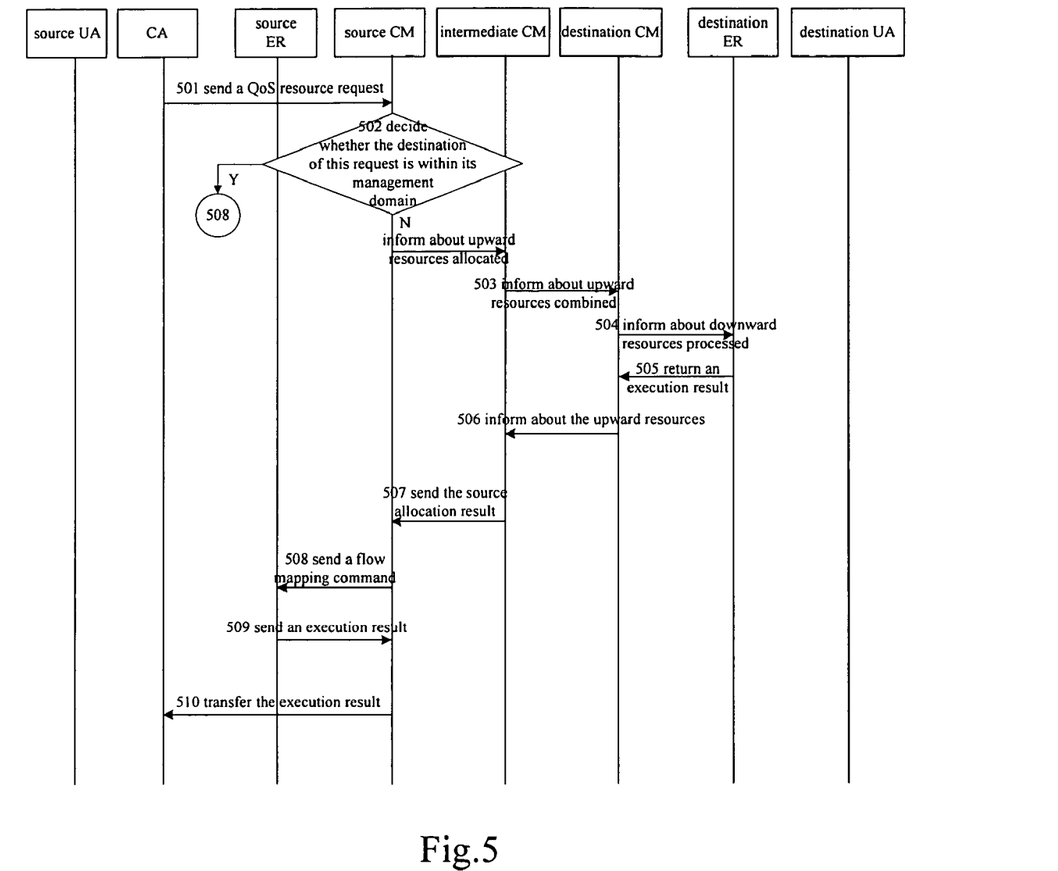
FIG. 5 is a flowchart of the single-phase IP QoS signalling process with bidirectional streams in an embodiment of the invention.

FIG. 5 illustrates the single-phase IP QoS signalling process with bidirectional streams, which includes:

Step 501: After receiving a request from a source UA for transferring a user service stream, a CA sends a QoS resource request to a source CM, the QoS resource request containing stream QoS parameters, a gating indication and information of a destination UA.

The QoS resource request should be a bidirectional resource request.

Step 502: After receiving the QoS resource request from the CA, the source CM determines whether the destination UA of the QoS resource request is within its management domain. If it isn't within the source CM's management domain, allocate resources of its domain for the user service stream, where the allocated resources contain both upward resources for the upward stream and downward resources for the downward stream, and transmit the QoS resource request to an intermediate CM. Meanwhile, the source CM will inform the downward resources allocated by itself to the intermediate CM, and forward to Step 503. If it is within the source CM's management domain, after the upward resources and downward resources of the source CM's domain have been allocated for the user service stream, forward to Step 508.

Step 503: Upon receiving the QoS resource request, the intermediate CM allocates both upward resources and downward resources within the intermediate CM's domain for the user service stream, combines both the downward resources sent from the source CM and the downward resources allocated by itself, and finally transfers the QoS resource request to the destination CM to inform a combined downward resources to the destination CM.

Step 504: After receiving the bidirectional QoS resource request, the destination CM allocates both upward resources and downward resources within its domain for the user service stream, combines the downward resources sent from the intermediate CM and the downward resources allocated by itself, and then transfers a flow mapping command and a gating indication to the destination ER according to the combined downward resources, as well as sending the combined downward resources to the destination ER.

During the single-phase processing, the flow mapping command and the gating indication are transferred at the same time.

Step 505: After receiving the flow mapping command and the gating indication, the destination ER allocates a bearer path for the user service stream, allows the user service stream to pass through itself, and then returns an execution result to the destination CM.

Step 506: After receiving the execution result from the destination ER, the destination CM returns the upward resources allocated by itself to the intermediate CM.

Step 507: The intermediate CM combines the upward resources sent from the destination CM and the upward resources allocated by itself, and then transfers a resource allocation result to the source CM.

Step 508: The source CM combines the upward resources sent from the intermediate CM and the upward resources allocated by itself. If the upward resources are allocated successfully, the upward resources will be sent to the source ER, and a flow mapping command and a gating indication will be transferred to the source ER, as well.

Step 509: The source ER performs flow mapping according to the flow mapping command, and allocates a bearer path for the user service stream according to the upward resources. Then, the source ER allows the user service stream to pass through itself based on the gating indication, and returns an execution result to the source CM.

Step 510: After the source CM receives the execution result from the source ER, the source CM transfers the execution result to the CA.

The above-mentioned is the single-phase IP QoS signalling process with bidirectional streams. As to the two-phase IP QoS signalling process with bidirectional streams, the allocated resources can be kept either on a CM, or on an ER, where the former is illustrated on FIG. 6, and the latter is illustrated on FIG. 7. These two procedures are hereinafter described respectively.

Figure 6:
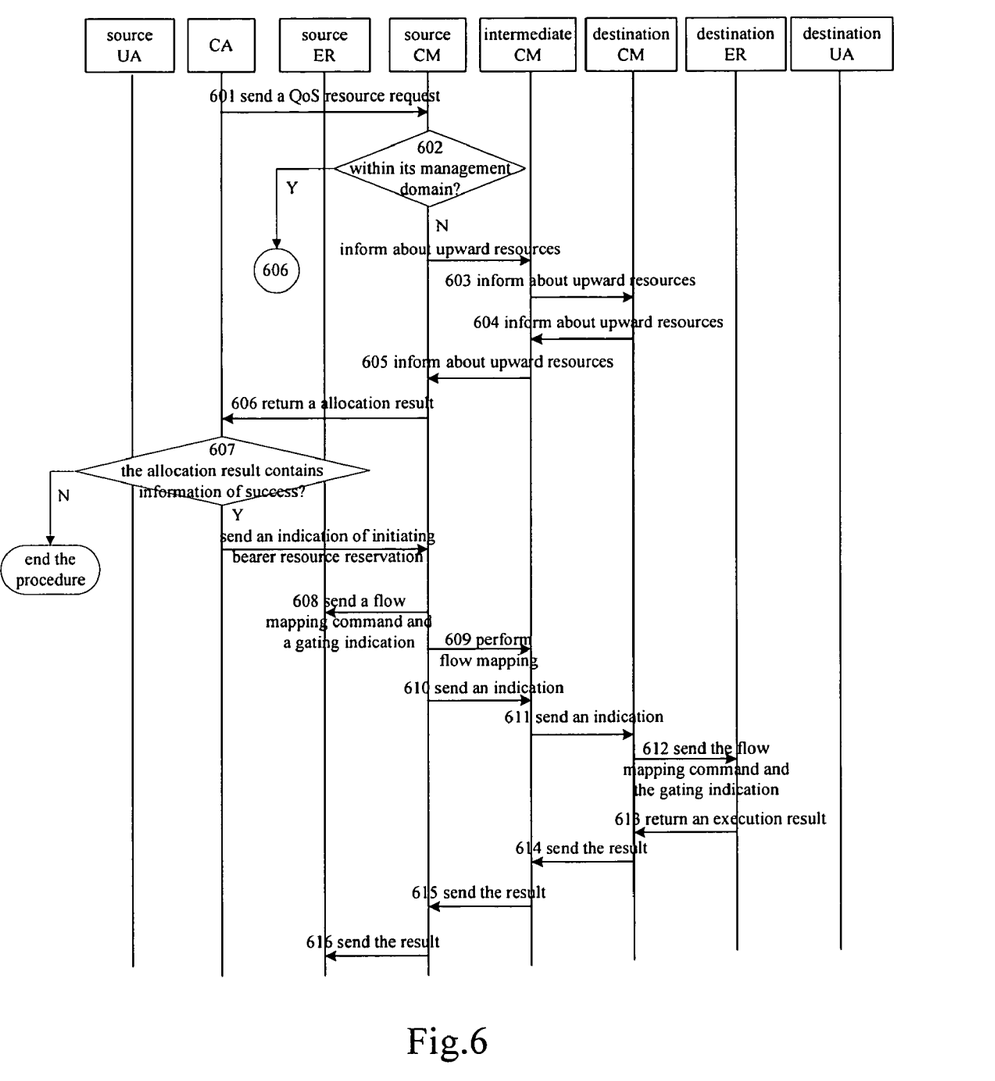
FIG. 6 is a flowchart of the two-phase IP QoS signalling process with bidirectional streams when resources are kept on a CM in an embodiment of the invention.

As shown on FIG. 6, the procedure of keeping resources on a CM includes:

Step 601: After receiving a request for transferring a user service stream from a source UA, a CA transfers a QoS resource request containing stream QoS parameters, a gating indication and information of a destination UA to the source CM.

The QoS resource request is a bidirectional resource request.

Step 602: After receiving the QoS resource request from the CA, the source CM determines whether the destination UA of the QoS resource request is within its management domain. If it is within the source CM's management domain, allocate upward and downward resources of this domain for the user service stream, deliver the QoS resource request to an intermediate CM, and send the downward resources allocated by the source CM to the intermediate CM. Otherwise, allocate upward resources and downward resources of its domain for the user service stream, and then forward to Step 606.

Step 603: After receiving the QoS resource request, the intermediate CM allocates both upward resources and downward resources within its domain for the user service stream, combines the downward resources sent from the source CM and the downward resources allocated by itself, and then delivers the QoS resource request to the destination CM and sends the combined downward resources to the destination CM.

Step 604: After receiving the QoS resource request, the destination CM allocates both upward resources and downward resources within its domain for the user service stream, combines the downward resources sent from the intermediate CM and the downward resources allocated by itself, and then transfers the upward resources allocated by itself to the intermediate CM.

Step 605: The intermediate CM combines the upward resources sent from the destination CM and the upward resources allocated by itself, and then returns a combined upward resources to the source CM. Step 606: The source CM combines the upward resources sent from the intermediate CM and the upward resources allocated by itself, and then returns a resource allocation result to the CA.

Step 607: If information of success is contained in the resource allocation result, the CA sends an indication of initiating bearer resource reservation to the source CM for initiating bearer resource reservation. When the source CM receives the indication from the CA, Steps 608 and 610 will be performed at the same time.

Step 608: The source CM transfers a flow mapping command and a gating indication to the source ER based on both the indication of initiating bearer resource reservation from the CA and the upward resources allocated by the source CM itself, then forwards to Step 609.

Step 609: The source ER carries out flow mapping according to the flow mapping command, allocates a bearer path for the user service stream according to the upward resources allocated by the bearer control layer, and allows the user service stream to pass through the source ER itself, and then transfers an execution result to the source CM, and forwards to Step 616.

Steps 610~611: The source CM transfers the received indication of initiating bearer resource reservation to the destination CM via the intermediate CM.

Actually, the source CM could directly transfer the received indication to the destination CM, not via the intermediate CM.

Step 612: The destination CM transfers a flow mapping command and a gating indication to the destination ER according to the downward resources allocated by itself before.

Step 613: The destination ER carries out flow mapping according to the flow mapping command, allocates a bearer path for the user service stream according to the downward resources, and allows the user service stream to pass through the destination ER itself, and then returns an execution result to the destination CM.

Steps 614~615: The destination CM transfers the execution result to the source CM via the intermediate CM.

Similarly, the destination CM could directly transfer the execution result to the source CM, not via the intermediate CM.

Step 616: The source CM transfers the execution result to the CA.

Figure 7:
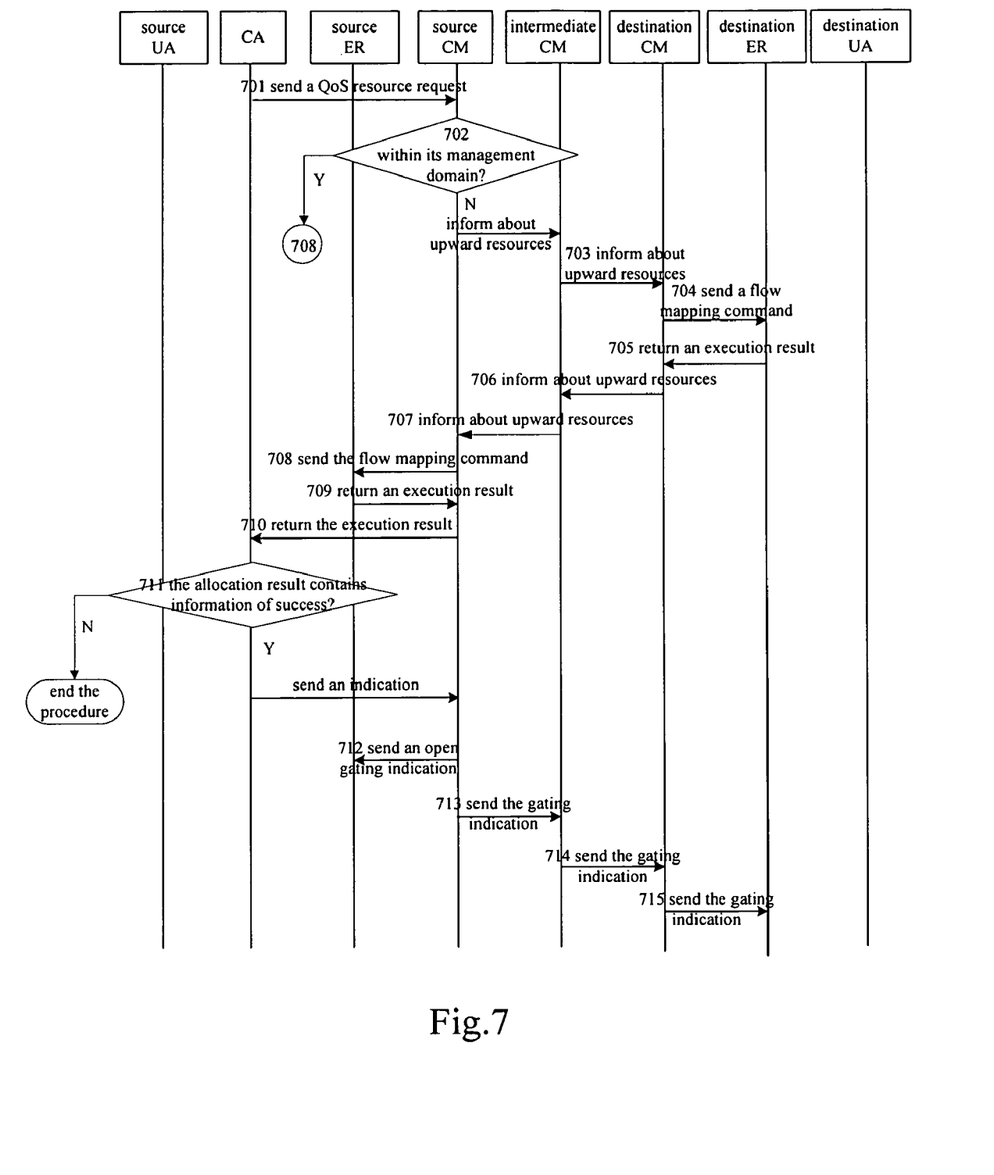
FIG. 7 is a flowchart of the two-phase IP QoS signalling process with bidirectional streams when resources are kept on an ER in an embodiment of the invention.

FIG. 7 illustrates the procedure of keeping resources on an ER, which includes:

Step 701: After receiving a request for transferring a user service stream from a source UA, a CA transfers a QoS resource request containing stream QoS parameters, a gating indication and information of a destination UA to the source CM.

The QoS resource request is a bidirectional resource request.

Step 702: After receiving the QoS resource request from the CA, the source CM determines whether the destination UA of the QoS resource request is within its management domain. If it is, allocate upward and downward resources within its domain for the user service stream, and deliver the QoS resource request to an intermediate CM. Otherwise, allocate upward and downward resources within its domain for the user service stream, then forward to Step 708.

Step 703: After receiving the QoS resource request, the intermediate CM allocates both upward resources and downward resources of its domain for the user service stream, combines the downward resources sent from the source CM and the downward resources allocated by itself, and then delivers the QoS resource request to the destination CM, and transfers the combined downward resources to the destination CM.

Step 704: After receiving the QoS resource request, the destination CM allocates both upward resources and downward resources within its domain for the user service stream, combines the downward resources sent from the intermediate CM and the downward resources allocated by itself, and then transfers a flow mapping command to the intermediate ER according to the combined downward resources.

Step 705: After receiving the flow mapping command, the destination ER allocates a bearer path for the user service stream, and returns an execution result to the destination CM.

Step 706: After receiving the execution result, the destination CM returns the upward resources allocated in advance to the intermediate CM.

Step 707: The intermediate CM combines the upward resources sent from the destination CM and the upward resources allocated by itself, and then sends a combined upward resources to the source CM.

Step 708: The source CM combines the upward resources sent from the intermediate CM and the upward resources allocated by itself. If the upward resources are allocated successfully, a flow mapping command will be transferred to the source ER according to the upward resources.

Step 709: The source ER carries out flow mapping according to the flow mapping command, allocates a bearer path for the user service stream according to the upward resources, and returns an execution result to the source CM.

Step 710: After receiving the execution result from the source ER, the source CM returns an execution result to the CA.

Step 711: If the execution result contains information of success, the CA sends out an indication of initiating service stream activation to the source CM, in order to perform Steps 712 and 713 at the same time. If the execution result contains information of failure, end the procedure.

Step 712: The source CM transfers an open gating indication to the source ER, allowing the user service stream to pass through itself.

Thus, the user service stream can be born on the bearer resource allocated in advance via the source ER.

Steps 713~714: The source CM transfers a gating indication to the destination CM via the intermediate CM.

Actually, the source CM could directly transfer a gating indication to the destination CM, and not via the intermediate CM.

Step 715: The destination CM transfers a gating indication to the destination ER, allowing the user service stream to pass through.

Via the above-mentioned procedures, user service streams can flow in bidirection.

For the situation that the bearer control layer allocates upward resources and downward resources respectively, after finishing resource allocation, subsequent processes are similar to the process in which upward and downward resources are allocated uniformly.

After a bearer path is allocated with any of the above procedures, a user service stream can be transferred in the bearer network, i.e., a session between users can be set up. However, after the session has been set up, a CA can initiate a close or open gating indication at any moment if necessary. For example, if it is needed for the CA to end transferring the user service stream, the CA can send out a close gating indication. After the user service stream is closed, if it is needed to keep or restart the user service stream, the CA can send out an open gating indication to re-open the user service stream. This kind of indication is sent to the ER via the CM, and the ER may determine whether to allow the user service stream to pass through based on the open gating indication.

Specifically, if the user service stream is unidirectional, the CA may transfer the open gating indication to the source CM, and the source CM delivers the open gating indication to the source ER. The source ER will determine whether to allow the user service stream to pass through according to the open gating indication.

If the user service stream is bidirectional, after the CA transfers the open gating indication to the source CM, the source CM will transfer the open gating indication to both the source ER and the destination CM via the bearer control layer. Then, the destination CM delivers the open gating indication to the destination ER. Naturally, the source ER or the destination ER determines respectively whether to allow the user service stream to pass through itself according to the open gating indication.

To sum up, the foregoing is only preferred embodiments of the invention, and it is not used for limiting the protection scope thereof.

The invention claimed is:

1. A signalling exchange method for guaranteeing Internet Protocol (IP) Quality of Service (QoS), which is applicable for a network with an independent bearer control layer, the method comprising:

upon receiving a request from a source User Agent (UA) for transferring a user service stream, sending, by a Call Agent (CA), a QoS resource request to a source Call Manager (CM) of the bearer control layer, wherein the QoS resource request contains a stream QoS parameter and information of a destination UA;

after receiving the QoS resource request from the CA, determining, by the source CM, whether the destination UA of the QoS resource request is within the management domain to which the source CM belongs;

allocating resources for the user service stream on the bearer control layer according to the determination result, and sending a flow mapping command to an Edge Router (ER) according to the resource allocation result; and after receiving the flow mapping command, allocating, by the ER, a bearer path for the user service stream based on the allocated resources, and transferring an execution result to the CA via the bearer control layer.

2. The method according to claim 1, wherein the QoS resource request is a unidirectional resource request; and the process of the bearer control layer allocating resources for the user service stream comprises: initiating the bearer control layer to perform upward resource allocation by a Call Manager (CM) of the source bearer network.

3. The method according to claim 2, further comprising: sending, by the source CM, the upward resources allocated by the bearer control layer to the source ER, and transferring a flow mapping command and a gating indication to the source ER; and the process of the ER allocating a bearer path for the user service stream according to the allocated resources comprises: upon receiving the flow mapping command, allocating by the source ER a bearer path for the user service stream according to the upward resources, and controlling the user service stream to pass through itself according to the gating indication.

4. The method according to claim 2, wherein the QoS resource request comprises: a gating indication; and the method further comprises: the source CM on the bearer control layer transferring the upward resource allocation result to the CA, and after confirming that the upward resources have been allocated successfully, the CA sending an indication of initiating bearer resource reservation to the source CM; and after receiving the indication of initiating bearer resource reservation, the source CM sending the allocated upward resources to the source ER, and transferring a flow mapping command and a gating indication to the source ER;

the process of the ER allocating a bearer path for the user service stream according to the allocated resources comprises: after receiving the flow mapping command, the source ER allocating a bearer path for the user service stream according to the upward resources, and controlling the user service stream to pass through itself according to the gating indication.

5. The method according to claim 2, wherein the QoS resource request comprises: a gating indication; and the method further comprises: the source CM informing the upward resources allocated by the bearer control layer to the source ER, and transferring a flow mapping command and a gating indication to the source ER; and after the CA receives the execution result, the method further comprises: transferring an indication of initiating service stream activation to the source CM, the source CM sending a gating indication to the source ER according to the indication of initiating service stream activation, and the source ER controlling the user service stream to pass through itself according to the gating indication.

6. The method according to claim 1, wherein the QoS resource request is a bidirectional resource request; and the process of the bearer control layer allocating resources for the user service stream comprises: the source CM initiating upward resource allocation within the bearer control layer, and the destination CM initiating downward resource allocation within the bearer control layer.

7. The method according to claim 6, further comprising: informing the downward resources allocated by the destination CM on the bearer control layer to the destination ER, and transferring a flow mapping command and a gating indication to the destination ER;

sending the upward resources allocated by the source CM on the bearer control layer to the source ER, and transferring a flow mapping command and a gating indication to the source ER; and the process of the ER allocating a bearer path for the user service stream according to the allocated resources comprises:

allocating, by the destination ER, a bearer path for the user service stream according to the downward resources, and controlling the user service stream to pass through the destination ER according to the gating indication;

allocating, by the source ER, a bearer path for the user service stream according to the upward resources, and controlling the user service stream to pass through the source ER according to the gating indication.

8. The method according to claim 6, wherein the QoS resource request comprises: a gating indication; and the method further comprises: the source CM on the bearer control layer informing the resource allocation result to the CA, and after confirming that both the upward resources and downward resources are allocated successfully, the CA transferring an indication of initiating bearer resource reservation to the source CM;

after receiving the indication of initiating bearer resource reservation, the source CM sending the allocated upward resources to the source ER, and transferring a flow mapping command and a gating indication to the source ER;

the source CM sending the allocated downward resources to the destination CM via the bearer control layer, and the destination CM transferring a flow mapping command and a gating indication to the destination ER; and the process of the ER allocating a bearer path for the user service stream according to the resources allocated comprises:

after receiving the flow mapping command, the source ER allocating a bearer path for the user service stream according to the upward resources, and controlling the user service stream to pass through the ER itself according to the gating indication;

after receiving the flow mapping command, the destination ER allocating a bearer path for the user service stream according to the downward resources, and controlling the user service stream to pass through the ER itself according to the gating indication.

9. The method according to claim 6, wherein the QoS resource request comprises: a gating indication; and the method further comprises:

the destination CM on the bearer control layer transferring the allocated downward resources to the destination ER, and transferring a flow mapping command and a gating indication to the destination ER;

the source CM on the bearer control layer informing the allocated upward resources to the source ER, and transferring a flow mapping command and a gating indication to the source ER; and after the CA receives the execution result, the method further comprises:

transferring an indication of initiating service stream activation to the source CM, the source CM transferring a gating indication to the source ER according to the activation indication, and the source ER controlling the user service stream to pass through itself according to the gating indication;

the source CM transferring the gating indication to the destination ER via the bearer control layer, and the destination ER controlling the user service stream to pass through itself according to the gating indication.

10. The method according to claim 1, wherein the QoS resource request is a bidirectional resource request; and the process of the bearer control layer allocating resources for the user service stream comprises: the source CM initiating both upward resource and downward resource allocation within the bearer control layer at the same time.

11. The method according to claim 10, further comprising:

informing the downward resources allocated by the destination CM on the bearer control layer to the destination ER, and transferring a flow mapping command and a gating indication to the destination ER;

sending the upward resources allocated by the source CM on the bearer control layer to the source ER, and transferring a flow mapping command and a gating indication to the source ER; and the process of the ER allocating a bearer path for the user service stream according to the allocated resources comprises:

allocating, by the destination ER, a bearer path for the user service stream according to the downward resources, and controlling the user service stream to pass through the destination ER according to the gating indication;

allocating, by the source ER, a bearer path for the user service stream according to the upward resources, and controlling the user service stream to pass through the source ER according to the gating indication.

12. The method according to claim 10, wherein the QoS resource request comprises: a gating indication; and the method further comprises: the source CM on the bearer control layer sending the resource allocation result to the CA, and after confirming that both the upward resources and downward resources are allocated successfully, the CA transferring an indication of initiating bearer resource reservation to the source CM;

after receiving the indication of initiating bearer resource reservation, the source CM sending the allocated upward resources to the source ER, and transferring a flow mapping command and a gating indication to the source ER;

the source CM sending the allocated downward resources to the destination CM via the bearer control layer, and the destination CM transferring a flow mapping command and a gating indication to the destination ER; and the process of the ER allocating a bearer path for the user service stream according to the resources allocated comprises:

after receiving the flow mapping command, the source ER allocating a bearer path for the user service stream according to the upward resources, and controlling the user service stream to pass through the ER itself according to the gating indication;

after receiving the flow mapping command, the destination ER allocating a bearer path for the user service stream according to the downward resources, and controlling the user service stream to pass through the ER itself according to the gating indication.

13. The method according to claim 10, wherein the QoS resource request comprises: a gating indication; and the method further comprises:

the destination CM on the bearer control layer transferring the allocated downward resources to the destination ER, and transferring a flow mapping command and a gating indication to the destination ER;

the source CM on the bearer control layer sending the allocated upward resources to the source ER, and transferring a flow mapping command and a gating indication to the source ER; and after the CA receives the execution result, the method further comprises:

transferring an indication of initiating service stream activation to the source CM, transferring by the source CM a gating indication to the source ER according to the activation indication, and the source ER controlling the user service stream to pass through itself according to the gating indication;

transferring by the source CM the gating indication to the destination ER via the bearer control layer, and the destination ER controlling the user service stream to pass through itself according to the gating indication.

14. The method according to claim 1, wherein the process of transferring the execution result from the ER to the CA via the bearer control layer comprises: the source ER transferring the execution result to the CA via the source CM of the bearer control layer.

15. The method according to claim 1, further comprising: after transferring the user service stream via the bearer network, the CA initiating a close gating indication to the bearer control layer, the bearer control layer delivering the close gating indication to the ER, and the ER refusing the user service stream to pass through itself according to the close gating indication.

16. The method according to claim 15, further comprising: the CA initiating an open gating indication to the bearer control layer, the bearer control layer delivering the open gating indication to the ER, and the ER allowing the user service stream to pass through itself according to the open gating indication.

17. The method according to claim 1, wherein the allocating resources for the user service stream on the bearer control layer according to the determination result, comprises:

if the destination UA of the QoS resource request is not within the management domain, the source CM allocating upward resources of the management domain to which the source CM belongs to the user service stream, and transferring the QoS resource request to an intermediate CM; and if the destination UA of the QoS resource request is within the management domain, the source CM allocating upward resources within the management domain to which the source CM belongs for the user service stream, combining the upward resources sent from the intermediate CM and the upward resources allocated by itself, and sending a combined upward resources to a source ER.

* * * * *